US010872199B2

United States Patent
Livingston et al.

(10) Patent No.: US 10,872,199 B2
(45) Date of Patent: Dec. 22, 2020

(54) MAPPING A GESTURE AND/OR ELECTRONIC PEN ATTRIBUTE(S) TO AN ADVANCED PRODUCTIVITY ACTION

(71) Applicant: Microsoft Technology Licensing, LLC, Redmond, WA (US)

(72) Inventors: Elise Leigh Livingston, Seattle, WA (US); Daniel Yancy Parish, Seattle, WA (US); Adam Samuel Riddle, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/990,598

(22) Filed: May 26, 2018

(65) Prior Publication Data

US 2019/0361970 A1    Nov. 28, 2019

(51) Int. Cl.
| | | |
|---|---|---|
| *G06F 17/00* | (2019.01) | |
| *G06F 40/171* | (2020.01) | |
| *G06F 3/0354* | (2013.01) | |
| *G06F 3/0488* | (2013.01) | |
| *G06F 40/103* | (2020.01) | |
| *G06F 40/30* | (2020.01) | |

(52) U.S. Cl.
CPC ........ *G06F 40/171* (2020.01); *G06F 3/03545* (2013.01); *G06F 3/04883* (2013.01); *G06F 40/103* (2020.01); *G06F 40/30* (2020.01)

(58) Field of Classification Search
CPC . G06F 3/03545; G06F 3/04883; G06F 17/242
See application file for complete search history.

(56) References Cited

U.S. PATENT DOCUMENTS

| | | |
|---|---|---|
| 6,434,581 B1 | 8/2002 | Forcier |
| 7,259,752 B1 | 8/2007 | Simmons |
| 7,752,555 B2 | 7/2010 | Sutanto et al. |
| 8,773,370 B2 | 7/2014 | Hogan |
| 9,201,520 B2 | 12/2015 | Benko et al. |
| 9,904,465 B2 | 2/2018 | Angelov et al. |
| 2002/0149630 A1 | 10/2002 | Kitainik et al. |

(Continued)

OTHER PUBLICATIONS

"Edit your document with natural gestures", Retrieved from: https://web.archive.org/web/20170829064956/https:/support.office.com/en-us/article/edit-your-document-with-natural-gestures-7edbcf8e-0004-484d-9b62-501a31c23ee9, Aug. 29, 2017, 6 Pages.

(Continued)

*Primary Examiner* — Scott T Baderman
*Assistant Examiner* — Barbara M Level
(74) *Attorney, Agent, or Firm* — Rainier Patents, P.S.

(57) ABSTRACT

Described herein is a system and method for modifying electronic documents. While a user is editing an electronic document on a canvas of an application, a trigger event related to an electronic pen is received (e.g., explicitly or inferred). The electronic pen has one or more associated attributes (e.g., type of pen, color of pen, thickness of line, transparency value). In response to the trigger event, which of a plurality of advanced productivity actions related to editing to apply to the electronic document is determined based upon at least one of the associated attributes. The advanced production actions can include, for example, styles, formatting, and/or themes. The electronic document is modified in accordance with the determined advanced productivity action.

20 Claims, 5 Drawing Sheets

(56) References Cited

U.S. PATENT DOCUMENTS

| | | | |
|---|---|---|---|
| 2002/0188632 A1* | 12/2002 | Su | G06F 16/958 715/227 |
| 2005/0229117 A1* | 10/2005 | Hullender | G06F 3/04883 715/863 |
| 2007/0009184 A1 | 1/2007 | Bhogal et al. | |
| 2007/0050699 A1* | 3/2007 | Simkhay | G06F 40/18 715/235 |
| 2007/0139399 A1 | 6/2007 | Cook | |
| 2008/0301542 A1 | 12/2008 | Mcgee et al. | |
| 2011/0314390 A1 | 12/2011 | Park et al. | |
| 2012/0013540 A1 | 1/2012 | Hogan | |
| 2013/0120281 A1 | 5/2013 | Harris | |
| 2014/0189482 A1* | 7/2014 | Hill | G06F 3/04883 715/212 |
| 2014/0198069 A1 | 7/2014 | Park et al. | |
| 2014/0298272 A1* | 10/2014 | Doan | G06F 3/04883 715/863 |
| 2015/0123988 A1* | 5/2015 | Ohmori | G06F 3/03545 345/594 |
| 2015/0302242 A1 | 10/2015 | Lee et al. | |
| 2015/0317053 A1* | 11/2015 | Baek | G06F 3/0488 715/765 |
| 2015/0338938 A1 | 11/2015 | Vong | |
| 2016/0041968 A1 | 2/2016 | Gerhard et al. | |
| 2016/0085422 A1 | 3/2016 | Lee et al. | |
| 2016/0147436 A1* | 5/2016 | Tsutsui | G06K 9/00416 715/268 |
| 2016/0275066 A1 | 9/2016 | Otero et al. | |
| 2017/0364248 A1 | 12/2017 | Tran et al. | |
| 2018/0024708 A1* | 1/2018 | Kim | G06F 17/241 715/268 |

OTHER PUBLICATIONS

Pfeuffer, et al., "Thumb + Pen Interaction on Tablets", In Proceedings of the CHI Conference on Human Factors in Computing Systems, May 6, 2017, 13 Pages.

Song, et al., "Grips and Gestures on a Multi-Touch Pen", In Proceedings of the SIGCHI Conference on Human Factors in Computing Systems, May 7, 2011, pp. 1-10.

"International Search Report and Written Opinion Issued in PCT Application No. PCT/US2019/031919", dated Jul. 24, 2019, 12 Pages.

* cited by examiner

MAPPING A GESTURE AND/OR ELECTRONIC PEN ATTRIBUTE(S) TO AN ADVANCED PRODUCTIVITY ACTION

BACKGROUND

With increasing frequency, computer users have become familiar with adding digital ink (electronic ink) to electronic documents. For example, a stylus or electronic pen can be used to write on an electronic input screen to add digital ink to an electronic document.

SUMMARY

Described herein is a system for modifying an electronic document, comprising: a computer comprising a processor and a memory having computer-executable instructions stored thereupon which, when executed by the processor, cause the computer to: while a user is editing an electronic document on a canvas of an application, receive a trigger event related to an electronic pen, the electronic pen having one or more associated attributes; in response to the trigger event, determine which of a plurality of advanced productivity actions related to editing to apply to the electronic document based upon at least one of the associated attributes; and modify the electronic document in accordance with the determined advanced productivity action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
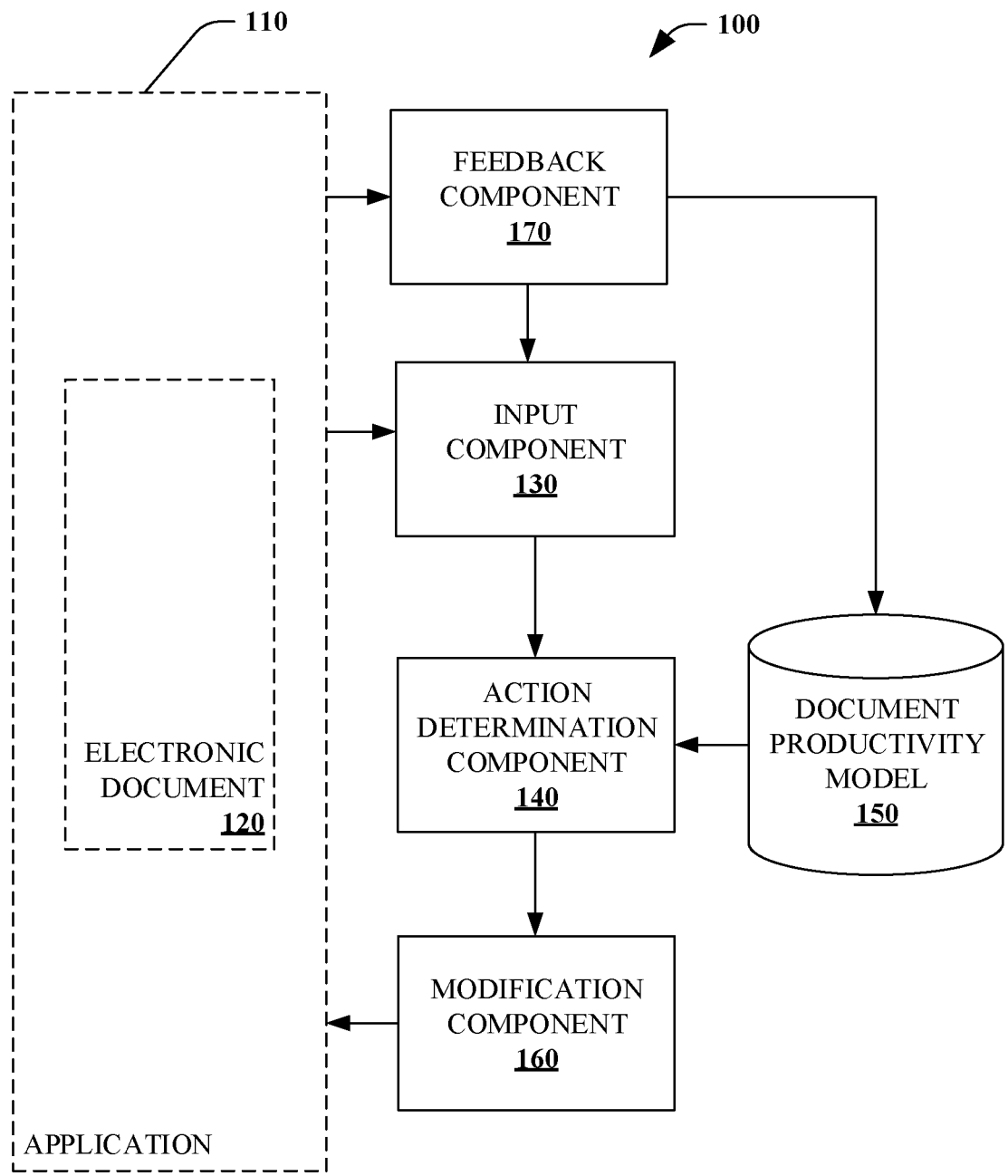
FIG. 1 is a functional block diagram that illustrates a system for modifying an electronic document.

Various technologies pertaining to modifying an electronic document by mapping a gesture (e.g., received from a user via an electronic pen) and/or electronic pen attribute(s) to advanced productivity action(s) (e.g., style(s), formatting, and/or theme(s)) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding modifying an electronic document by mapping a gesture (e.g., received from a user via an electronic pen) and/or electronic pen attribute(s) to advanced productivity action(s) (e.g., style(s), formatting, theme(s)). What follows are one or more exemplary systems and methods.

Aspects of the subject disclosure pertain to the technical problem of modifying electronic document(s) using advanced productivity actions such as styles, formatting, and/or themes using an electronic pen. The technical features associated with addressing this problem involve while a user is editing an electronic document on a canvas of an application, receiving a trigger event related to an electronic pen, the electronic pen having one or more associated attributes; in response to the trigger event, determining which of a plurality of advanced productivity actions related to editing to apply to the electronic document based upon at least one of the associated attributes; and modifying the electronic document in accordance with the determined advanced productivity action. Accordingly, aspects of these technical features exhibit technical effects of more efficiently and effectively modifying electronic document(s) using advanced productivity actions thus reducing computer resource(s) and/or increasing user satisfaction.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Users have become increasingly familiar with using electronic pen(s) to edit, view and/or interact with electronic documents. Described herein is a system and method that, in some embodiments, receives a trigger event (e.g., switching pen type(s) on user experience) to enter a mode in which gesture(s) (e.g., digital ink stroke(s)) and/or attribute(s) associated with the electronic pen are used to determine a particular advanced productivity action (e.g., style(s), formatting, theme(s)) to be applied to an electronic document. In some embodiments, attribute(s) associated with the electronic pen (e.g., type of pen, color of pen, thickness of line, transparency value) are mapped to the particular advanced productivity action. In some embodiments, physical attribute(s) associated with the electronic pen (e.g., globally unique identifier (GUID), type of physical electronic pen, interchangeable physical electronic pen tips, positional information, orientation information) are mapped to the particular advanced productivity action.

Referring to FIG. 1, a system for modifying an electronic document 100 is illustrated. The system 100 includes an application 110 used to view, generate, and/or edit an electronic document 120. Examples of suitable applications 110 include, but are not limited to, word processing, spreadsheet, database, slide presentation, electronic mail, drawing, note taking, web browser, media player, and game applications. In some embodiments, the system 100 can facilitate modifying the electronic document 120 in accordance with a particular advanced productivity action (e.g., defined style(s), defined formatting, defined theme(s)) based upon a user's interaction with the electronic document 120 using an electronic pen.

The system 100 includes an input component 130 that, while the user is editing the electronic document 120 on a canvas of the application 110, receives a trigger event related to the electronic pen. The input component 130 can receive information regarding the user's interaction with the electronic document 120 using the electronic pen. In some embodiments, the input component 130 identifies a trigger event based upon an explicit action of the user. In some embodiments, the trigger event can be based upon a change in attribute(s) associated with the electronic pen via a user experience ribbon of the application 110. For example, in some embodiments, changing from a pen to highlighter via the user experience ribbon of the application 110 can be the trigger event.

In some embodiments, the input component 130 infers the trigger event based upon the particular user's previous history with the system 100. In some embodiments, the input component 130 infers the trigger event based upon information regarding the user's interaction with the electronic document 120 using the electronic pen and content and/or semantic structure of a portion of the electronic document. For example, in some embodiments, the input component 130 can infer the trigger event in response to a user's highlighting of a heading of a column followed by a downward gesture using the electronic pen (e.g., covering at least a predetermined portion of the column).

In some embodiments, in addition to the trigger event, the input component 130 receives and/or identifies attribute(s) associated with the electronic pen (e.g., type of pen, color of pen, thickness of line, transparency value). In some embodiments, a type of pen can be a setting under the user's control and selection via a user experience ribbon the application 110. For example, the user can select from a plurality of types of pen such as pencil, pen, and/or highlighter. In some embodiments, the user can further select settings such as a color associated with the selected type of pen and/or a line thickness.

In some embodiments, the input component 130 receives and/or identifies physical attribute(s) associated with the electronic pen (e.g., globally unique identifier (GUID) of the electronic pen, type of pen, interchangeable pen tip installed). In some embodiments, the input component 130 receives and/or identifies content and/or semantic structure of a portion of the electronic document 120 in proximity to a received gesture (e.g., digital ink stroke).

In some embodiments, the trigger event causes the system 100 to enter a mode in which gesture(s) (e.g., digital ink stroke(s)) and/or attribute(s) associated with the electronic pen are interpreted as an advanced productivity action (e.g., command(s) and/or instruction(s) related to style(s), formatting and/or theme(s)) instead of the gesture(s) (e.g., digital ink stroke(s)) being directly interpreted as content to be added to the electronic document 120 (e.g., digital ink stroke(s) added as content to the electronic document 120).

The system 100 further includes an action determination component 140 that, in response to the trigger event, determines which of a plurality of advanced productivity actions related to editing of the electronic document 120 to be applied to the electronic document 120 (or portion thereof). The determination can be based upon one or more of the associated attributes, the received gesture, and/or the identified content and/or semantic structure of a portion of the electronic document 120 in proximity to the received gesture. In some embodiments, the action determination component 140 maps attribute(s) associated with the electronic pen, the received gesture (e.g., digital ink stroke), and/or identified content and/or semantic structure to a particular advanced productivity action related to editing of the electronic document (e.g., style(s), formatting, theme(s)).

In some embodiments, the action determination component 140 can utilize a document productivity model 150 to determine which particular advanced productivity action to apply to the electronic document 120 and/or which portion(s) of the electronic document 120 to apply the particular advanced productivity action. In some embodiments, the document productivity model 150 comprises one or more lists, tables or other data structures that map attribute(s), gestures (e.g., digital ink stroke(s)), and/or identified content and/or semantic structure (e.g., of a portion of the electronic document 120 in proximity to the received gesture) to particular advanced productivity actions.

In some embodiments, the document productivity model 150 calculates probabilities that particular attribute(s), gesture(s), and/or identified content and/or semantic structure of a portion of the electronic document 120 in proximity to the received gesture are indicative of a particular advanced productivity action. For example, the advanced productivity action with the highest calculated probability can be determined to be the particular advanced productivity action to be applied to the electronic document 120. In some embodiments, the document productivity model 150 can utilize one or more probabilistic algorithms including a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, and/or a Gradient Boost & Adaboost algorithm.

In some embodiments, the document productivity model 150 can be based upon an entity (e.g., corporation, education) associated with the user. Thus, common advanced productivity action(s) (e.g., report format) frequently utilized by users associated with the entity can be readily invoked using a particular gesture and/or attribute(s) associated with the electronic pen.

The system 100 further includes a modification component 160 that modifies the electronic document 120 in accordance with the particular advanced productivity action determined by the action determination component 140. By way of explanation and not limitation, advanced production actions can include formatting, style(s), and/or theme(s) to be applied to all or a portion of the electronic document 120.

In some embodiments, user input to invoke advanced productivity action(s) such as command(s) associated with the application 110 can be greatly enhanced by allowing the user to interact with the electronic document 120 in a more intuitive manner using the electronic pen. For example, for a spreadsheet application 110, when editing a table, when using a regular pen, advanced table manipulation actions such as adding rows and columns, merging cells, and/or splitting cells can be performed. However, when the user switches to a highlighter (e.g., trigger event), similar ink stroke(s) are converted by the system 100 to table formatting action(s) such as cell shading and/or table style(s).

In some embodiments, the system 100 includes an optional feedback component 170 that adapts the document productivity model 150 and/or the input component 130 based upon user feedback. For example, a user can indicate that a particular productivity action taken by the system 100 was correct. Based upon this feedback, the feedback component 170 can update the document productivity model 150 such that the particular attribute(s), gesture(s), and/or identified content and/or semantic structure of a portion of the electronic document 120 in proximity to the received gesture produces a higher calculated probability than previously calculated in determining the particular productivity action.

In some embodiments, a user can indicate that a particular productivity action taken by the system 100 was incorrect. Based upon this feedback, the feedback component 170 can update the document productivity model 150 such that the particular attribute(s), gesture(s), and/or identified content and/or semantic structure of a portion of the electronic document 120 in proximity to the received gesture produces a lower calculated probability than previously calculated in determining the particular productivity action.

Figure 2:
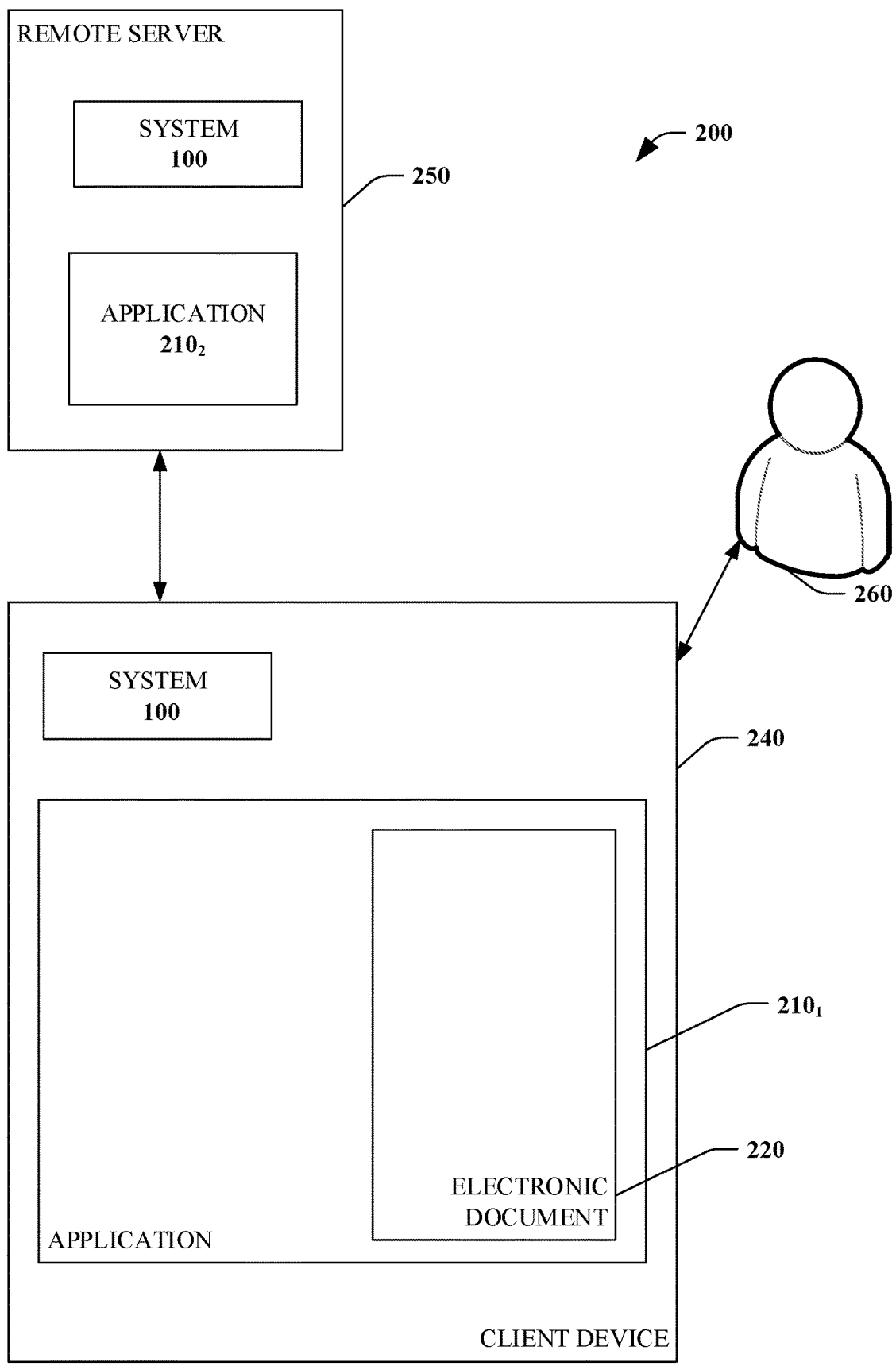
FIG. 2 is a functional block diagram that illustrates another system for modifying an electronic document.

Turning to FIG. 2, a system for modifying an electronic file 200 is illustrated. The system 200 includes an application 210$_1$, 210$_2$ (generally, 210) used to view, generate, and/or edit an electronic document 220 (e.g., electronic file). Examples of suitable applications 210 include, but are not limited to, word processing, spreadsheet, database, slide presentation, electronic mail, drawing, note taking, web browser, media player, and game applications.

In some embodiments, the application 210$_1$ is a thick client application stored locally on a client device 240. In some embodiments, the application 210$_2$ is thin client application (i.e., web applications) that resides on a remote service 250 and accessible over a network or combination of networks (e.g., the Internet, wide area networks, local area networks). A thin client application 210$_2$ can be hosted in a browser-controlled environment or coded in a browser-supported language and reliant on a common web browser to render the application executable on the client device 240.

A user 260 can use the application 210 to create a new document 220, edit an existing document 220, and/or view an existing document 220. The application 210 receives input from the user 260, for example, text input, from one or more input devices including, for example, a keyboard, a computer mouse, a remote control, an electronic pen. In some embodiments, the application 210 receives input from the user 260 through a Natural User Interface (NUI) which enables the user to interact with the client device 240 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

The user input results at least a portion of the electronic document 220 being modified in accordance with a determined advanced productivity action, as discussed above. The system 200 can include the system 100. In some embodiments, the system 100 executes on the remote server 250. In some embodiments, the system 100 executes on the client device 240.

Figure 3:
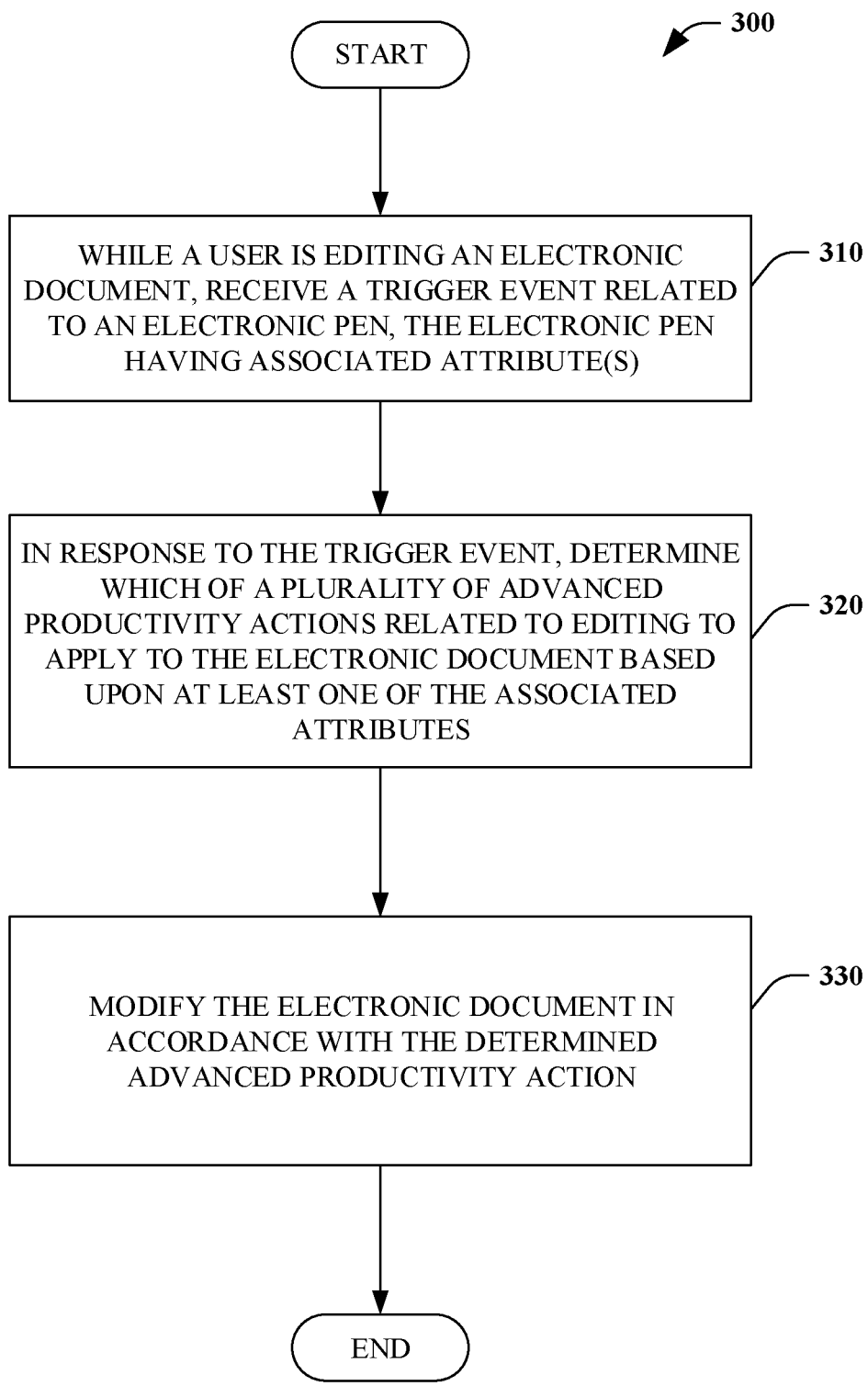
FIG. 3 is a flow chart that illustrates a method of modifying an electronic document.
Figure 4:
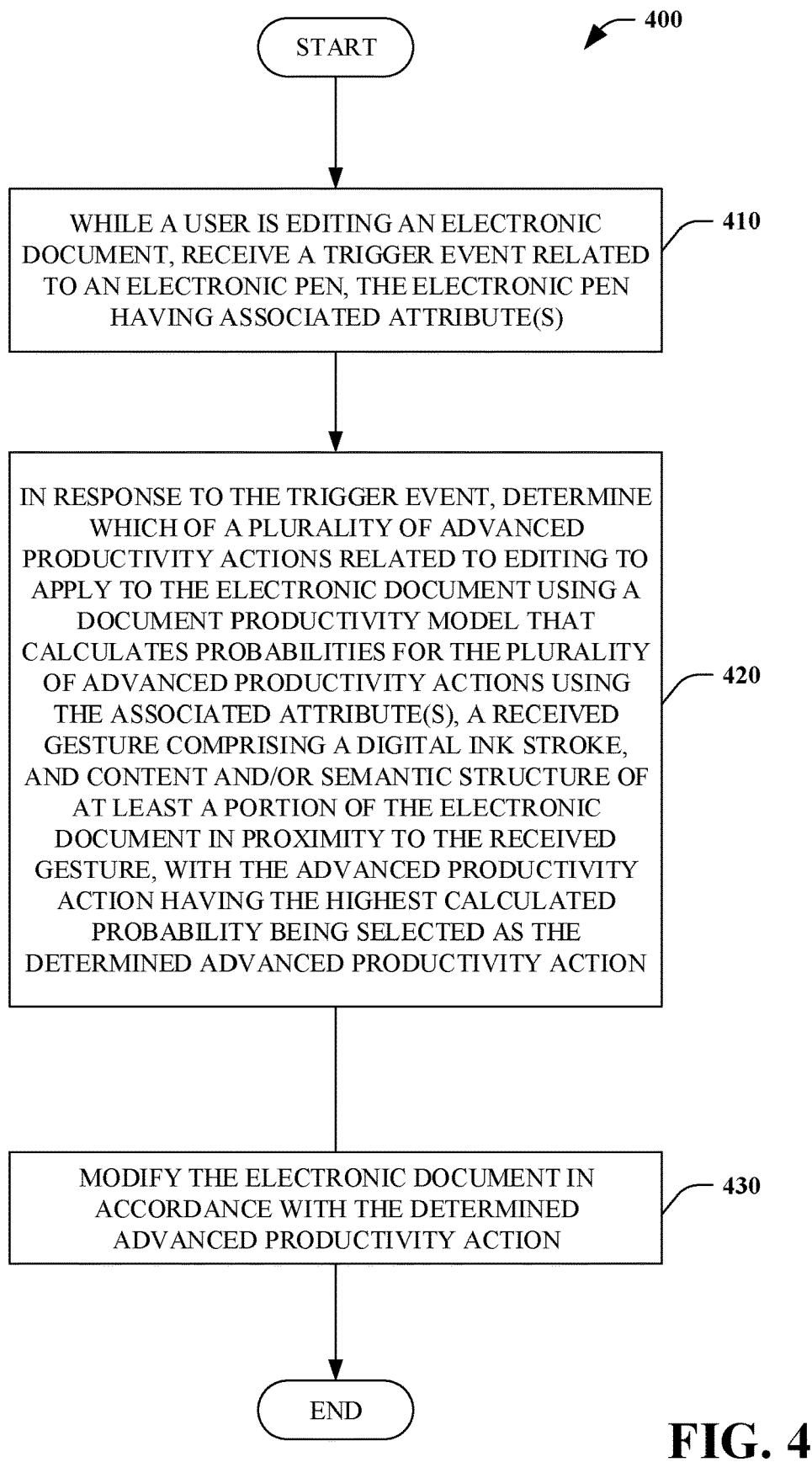
FIG. 4 is a flow chart that illustrates another method of modifying an electronic document.

FIGS. 3 and 4 illustrate exemplary methodologies relating to modifying an electronic document. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of modifying an electronic document 300 is illustrated. In some embodiments, the method 300 is performed by the system 100. At 310, while a user is editing an electronic document, a trigger event related to an electronic pen is received. The electronic pen can have one or more associated attributes (e.g., type of pen, color of pen, thickness of line, transparency value).

At 320, in response to the trigger event, which of a plurality of advanced productivity actions related to editing to apply to the electronic document is determined based upon at least one of the associated attributes. At 330, the electronic document is modified in accordance with the determined advanced productivity action.

Turning to FIG. 4, a method of modifying an electronic document 400 is illustrated. In some embodiments, the method 400 is performed by the system 100. At 410, while a user is editing an electronic document, a trigger event related to an electronic pen is received. The electronic pen can have one or more associated attributes (e.g., type of pen, color of pen, thickness of line, transparency value).

At 420, in response to the trigger event, which of a plurality of advanced productivity actions related to editing to apply to the electronic document is determined using a document productivity model that calculates probabilities for the plurality of advanced productivity actions using the associated attribute(s), a received gesture comprising a digital ink stroke, and content and/or semantic structure of at least a portion of the electronic document in proximity to the received gesture, with the advanced productivity action having the highest calculated probability being selected as the determined advanced productivity action. At 430, the electronic document is modified in accordance with the determined advanced productivity action.

Described herein is a system for modifying an electronic document, comprising: a computer comprising a processor and a memory having computer-executable instructions stored thereupon which, when executed by the processor, cause the computer to: while a user is editing an electronic document on a canvas of an application, receive a trigger event related to an electronic pen, the electronic pen having one or more associated attributes; in response to the trigger event, determine which of a plurality of advanced productivity actions related to editing to apply to the electronic document based upon at least one of the associated attributes; and modify the electronic document in accordance with the determined advanced productivity action.

The system can further include wherein a gesture comprising a digital ink stroke is further received and determining which of the plurality of advanced productivity actions to apply is further based on the received gesture.

The system can further include wherein determining which of the plurality of advanced productivity actions to apply is further based on at least one of content or a semantic structure of a portion of the electronic document in proximity to the received gesture. The system can further include wherein the associated attributes comprise at least one of a type of pen, a color of pen, a thickness of line, or a transparency value. The system can further include wherein the associated attributes comprise at least one of a globally unique identifier of the electronic pen, a type of physical electronic pen, or a particular interchangeable physical electronic pen tip.

The system can further include wherein the particular advanced productivity action comprises a defined style. The system can further include wherein modifying the electronic document comprises formatting at least a portion of the electronic document in accordance with the defined style. The system can further include wherein the particular advanced productivity action comprises a defined formatting.

The system can further include wherein the particular advanced productivity action comprises a defined document theme. The system can further include wherein the trigger event is received based upon an explicit action of the user. The system can further include wherein the trigger event is inferred based upon a user's previous history with the system.

The system can further include wherein determine which of a plurality of advanced productivity actions to apply is further based upon a document productivity model that calculates probabilities for the plurality of advanced productivity actions using the one or more associated attributes, a received gesture comprising a digital ink stroke, and content or a semantic structure of a portion of the electronic document in proximity to the received gesture, with the advanced productivity action having the highest calculated probability being the determined advanced productivity action.

Described herein is a method of modifying an electronic document, comprising: while a user is editing an electronic document on a canvas of an application, receiving a trigger event related to an electronic pen, the electronic pen having one or more associated attributes; in response to the trigger event, determining which of a plurality of advanced productivity actions related to editing to apply to the electronic document based upon at least one of the associated attributes; and modifying the electronic document in accordance with the determined advanced productivity action.

The method can further include wherein a gesture comprising a digital ink stroke is further received and determining which of the plurality of advanced productivity actions to apply is further based on the received gesture. The method can further include wherein determining which of the plurality of advanced productivity actions to apply is further based on at least one of content or a semantic structure of a portion of the electronic document in proximity to the received gesture.

The method can further include wherein determining which of the plurality of advanced productivity actions to apply is further based upon a document productivity model that calculates probabilities for the plurality of advanced productivity actions using the one or more associated attributes, a received gesture comprising a digital ink stroke, and content or a semantic structure of a portion of the electronic document in proximity to the received gesture, with the advanced productivity action having the highest calculated probability being the determined advanced productivity action. The method can further include wherein the particular advanced productivity action comprises at least one of a defined style, a defined document theme, or defined formatting.

Described herein is a computer storage media storing computer-readable instructions that when executed cause a computing device to: while a user is editing an electronic document on a canvas of an application, receive a trigger event related to an electronic pen, the electronic pen having one or more associated attributes; in response to the trigger event, determine which of a plurality of advanced productivity actions related to editing to apply to the electronic document based upon at least one of the associated attributes; and modify the electronic document in accordance with the determined advanced productivity action.

The computer storage media can further include wherein a gesture comprising a digital ink stroke is further received and determining which of the plurality of advanced productivity actions to apply is further based on the received gesture and at least one of content or a semantic structure of at least a portion of the electronic document in proximity to the received gesture. The computer storage media can further include wherein determining which of the plurality of advanced productivity actions to apply is further based upon a document productivity model that calculates probabilities for the plurality of advanced productivity actions using the one or more associated attributes, a received gesture comprising a digital ink stroke, and content or a semantic structure of a portion of the electronic document in proximity to the received gesture, with the advanced productivity action having the highest calculated probability being the determined advanced productivity action.

Figure 5:
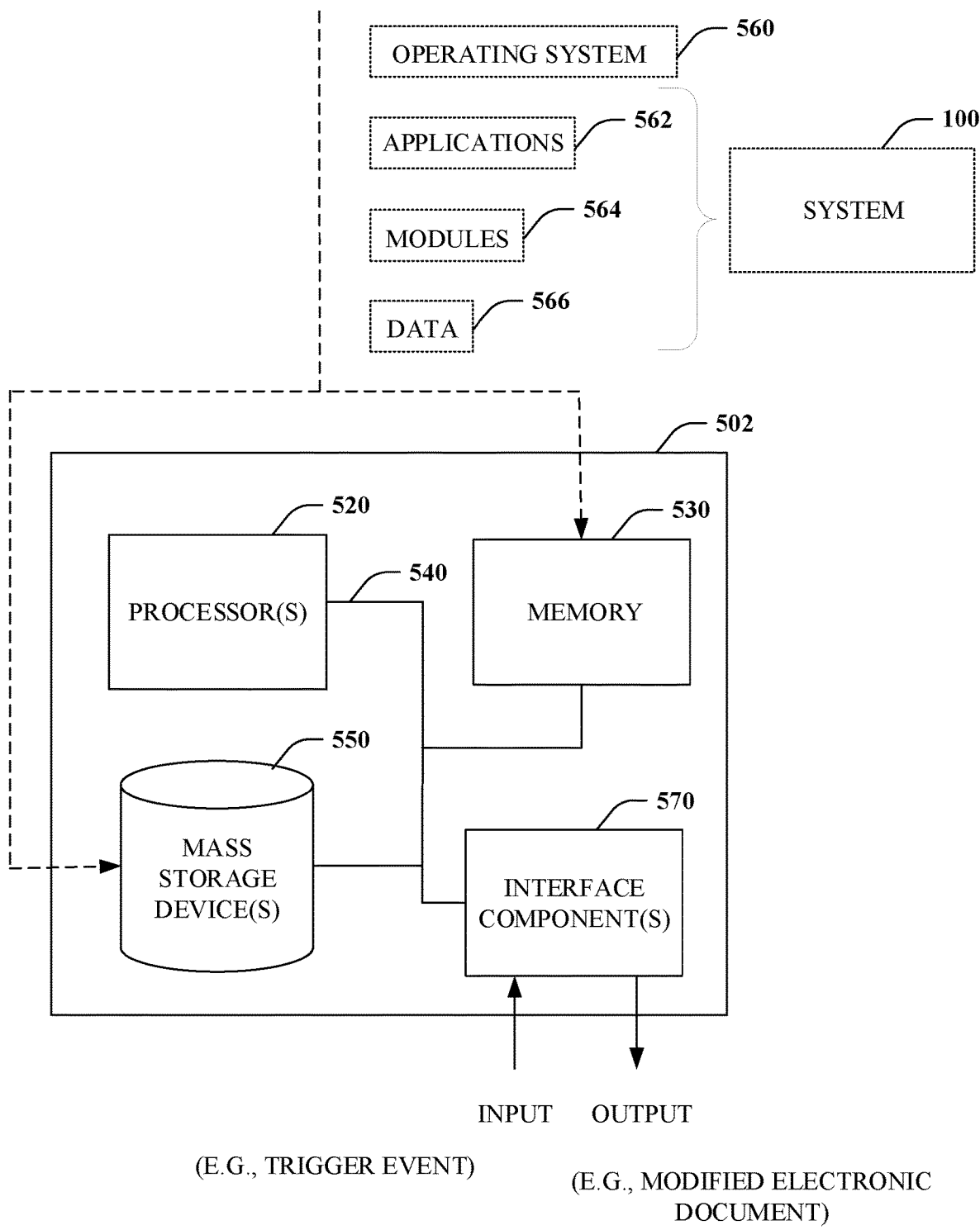
FIG. 5 is a functional block diagram that illustrates an exemplary computing system.

With reference to FIG. 5, illustrated is an example general-purpose computer or computing device 502 (e.g., mobile phone, desktop, laptop, tablet, watch, server, handheld, programmable consumer or industrial electronics, set-top box, game system, compute node, etc.). For instance, the computing device 502 may be used in a system for modifying an electronic document 100.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device (s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In accordance with one particular embodiment, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g., serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a processor and a memory having computer-executable instructions stored thereupon which, when executed by the processor, cause the system to:
provide mappings of different pen marking types to different table actions on tables of electronic documents, the mappings including a first mapping of a first pen marking type to a predefined table style for formatting tables of electronic documents and a second mapping of a second pen marking type to an advanced table manipulation that involves adding or removing cells from the tables of the electronic documents;
while a user is editing a particular table of a particular electronic document on a canvas of an application, receive a trigger event that changes an electronic pen to a selected pen marking type;
based at least on the selected pen marking type and the mappings, determine a particular table action to apply to the particular table of the particular electronic document, wherein the particular table action comprises applying the predefined table style to the particular table in first instances when the selected pen marking type is the first pen marking type and the particular table action comprises the advanced table manipulation in second instances when the selected pen marking type is the second pen marking type; and
modify the particular table of the particular electronic document in accordance with the particular table action.

2. The system of claim 1, wherein the computer-executable instructions, when executed by the processor, cause the system to:
receive a gesture comprising a digital ink stroke; and
modify the particular table responsive to the received gesture.

3. The system of claim 2, wherein the computer-executable instructions, when executed by the processor, cause the system to:
determine the particular table action to apply based on both the selected pen marking type and content of a portion of the particular electronic document that is in proximity to the received gesture.

4. The system of claim 1, wherein the selected pen marking type relates to at least one of a color of markings made by the electronic pen, a thickness of line markings made by the electronic pen, or a transparency value of markings made by the electronic pen.

5. The system of claim 1, wherein the computer-executable instructions, when executed by the processor, cause the system to:
determine the particular table action to apply based on both the selected pen marking type and a semantic structure of a portion of the particular electronic document that is in proximity to a received gesture.

6. The system of claim 1, wherein the advanced table manipulation involves adding a row to the particular table in the second instances when the selected pen marking type is the second pen marking type.

7. The system of claim 1, wherein the advanced table manipulation involves adding a column to the particular table in the second instances when the selected pen marking type is the second pen marking type.

8. The system of claim 1, wherein the advanced table manipulation involves merging cells of the particular table in the second instances when the selected pen marking type is the second pen marking type.

9. The system of claim 1, wherein the advanced table manipulation involves splitting cells of the particular table in the second instances when the selected pen marking type is the second pen marking type.

10. The system of claim 1, wherein the trigger event is received based at least upon an explicit action of a user.

11. The system of claim 1, wherein the trigger event is inferred based at least upon a user's previous history with the system.

12. The system of claim 1, wherein the computer-executable instructions, when executed by the processor, cause the system to:
determine which of the different table actions to apply based at least upon respective probabilities for the different table actions, the probabilities being determined using the selected pen marking type, content of the particular table, and a semantic structure of the particular table.

13. A method, comprising:
mapping a first type of pen marking to a predefined table style for formatting tables of electronic documents;
mapping a second type of pen marking to an advanced table manipulation that involves adding or removing cells from the tables of the electronic documents;
receiving a trigger event related to an electronic pen, the trigger event indicating a change to one or more marking attributes of the electronic pen;
in response to the trigger event, selecting a particular action to apply to a particular table of a particular electronic document based at least upon the one or more marking attributes of the electronic pen, wherein the particular action comprises applying the predefined table style to the particular table in instances when the trigger event indicates a change of the one or more marking attributes to the first type of pen marking and applying the advanced table manipulation to the particular table in other instances when the trigger event indicates a change of the one or more marking attributes to the second type of pen marking; and
modifying the particular table of the particular electronic document in accordance with the particular action.

14. The method of claim 13, wherein the first type of pen marking comprises highlighter markings and the second type of pen marking comprises regular pen markings.

15. The method of claim 14, wherein the modifying comprises:
performing the advanced table manipulation on the particular table in the other instances when the trigger event changes from the highlighter markings to the regular pen markings; and
applying the predefined table style to the particular table in the instances when the trigger event changes from the regular pen markings to the highlighter markings.

16. The method of claim 15, wherein the advanced table manipulation performed on the particular table in the other instances when the trigger event changes from the highlighter markings to the regular pen markings includes one or more of adding rows to the particular table, adding columns to the particular table, merging cells in the particular table, or splitting cells in the particular table.

17. The method of claim 13, wherein the advanced table manipulation comprises one or more of adding a row to the particular table, adding a column to the particular table, merging cells of the particular table, or splitting cells of the particular table.

18. A computer storage media storing computer-readable instructions that, when executed, cause a computing device to:
  during editing of a particular table of a particular electronic document on a canvas of an application, receive a trigger event related to an electronic pen, the trigger event selecting a particular type of pen marking for the electronic pen;
  access mappings of different pen marking types to different table actions, the mappings including a first mapping of a first pen marking type to a predefined table style for formatting tables of electronic documents and a second mapping of a second pen marking type to an advanced table manipulation that involves adding or removing cells from the tables of the electronic documents;
  based at least upon the mappings and the particular type of pen marking selected for the electronic pen, determine a particular table action to apply to the particular table of the particular electronic document, wherein the particular table action comprises applying the predefined table style to the particular table in first instances when the particular type of pen marking is the first pen marking type and the particular table action comprises the advanced table manipulation in second instances when the particular type of pen marking is the second pen marking type; and
  modify the particular table of the particular electronic document in accordance with the particular table action.

19. The computer storage media of claim 18, wherein the computer-readable instructions, when executed, cause the computing device to:
  receive a gesture comprising a digital ink stroke; and
  perform the particular table action in response to the gesture.

20. The computer storage media of claim 18, wherein the first pen marking type mapped to the predefined table style comprises a highlighter marking, and the second pen marking type mapped to the advanced table manipulation comprises a regular pen marking.

\* \* \* \* \*